United States Patent
Elbers et al.

(10) Patent No.: US 9,073,402 B2
(45) Date of Patent: Jul. 7, 2015

(54) STEERABLE TWIST-BEAM REAR SUSPENSION

(75) Inventors: Christoph Elbers, Stemwede (DE); Simon Aramah, Munich (DE); Jens Vortmeyer, Preussisch Oldendorf (DE); Marc Wiesenthal, Osnabruck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/240,409

(22) PCT Filed: Sep. 3, 2012

(86) PCT No.: PCT/EP2012/067071
§ 371 (c)(1),
(2), (4) Date: Feb. 24, 2014

(87) PCT Pub. No.: WO2013/037652
PCT Pub. Date: Mar. 21, 2013

(65) Prior Publication Data
US 2014/0203532 A1    Jul. 24, 2014

(30) Foreign Application Priority Data
Sep. 15, 2011 (DE) .......................... 10 2011 082 768

(51) Int. Cl.
*B60G 11/18* (2006.01)
*B60G 21/05* (2006.01)

(52) U.S. Cl.
CPC ........ *B60G 11/18* (2013.01); *B60G 2204/1226* (2013.01); *B60G 21/051* (2013.01);
(Continued)

(58) Field of Classification Search
CPC ........ B60G 7/02; B60G 7/005; B60G 21/051; B60G 21/055; B60G 21/0551; B60G 2200/14; B60G 2204/1224; B60G 2204/2204; B60G 2204/1226; B60G 11/18; B60G 21/053; B60G 2200/44; B60G 2200/21; B60G 2206/20; B62D 7/16; B62D 7/18

USPC .................... 280/124.106, 124.107, 124.108, 280/124.13, 124.131, 93.502, 93.51, 280/93.511, 93.512
See application file for complete search history.

(56) References Cited

U.S. PATENT DOCUMENTS 3,423,104 A * 1/1969 Cecil et al. ................ 280/93.512
3,527,316 A * 9/1970 Jones, Jr. et al. ............... 180/437
(Continued)

FOREIGN PATENT DOCUMENTS

DE   10 2007 055 353 A1   5/2009
DE   10 2008 002 639 A1   12/2009
(Continued)

OTHER PUBLICATIONS

German Search Report Corresponding to 10 2011 082 768.4 mailed Mar. 23, 2012.
(Continued)

*Primary Examiner* — Faye M Fleming
(74) *Attorney, Agent, or Firm* — Davis & Bujold, P.L.L.C.; Michael J. Bujold

(57) ABSTRACT

A torsion beam axle for a wheel suspension of a motor vehicle. The torsion beam axle has a torsionally compliant transverse section. A trailing arm is fixed at each opposed end of the transverse section. Each trailing arm supports a wheel carrier that pivots about a respective steering axis. The wheel carriers are connected to one another via ball joints and a tie rod, and couple an actuating mechanism for producing steering movement of the wheel carriers about their respective steering axes. A kinematic coupling system is connected to the tie rod and designed to regulate the degree of freedom of rotational movement of the tie rod. A torsion beam axle in which —to minimizing track angle differences or unsymmetrical bouncing behavior—the tie rod and actuating mechanism maintain optimum kinematic conditions in all operating situations.

12 Claims, 1 Drawing Sheet

(52) U.S. Cl.
CPC ......... *B60G2200/21* (2013.01); *B60G 2200/44* (2013.01); *B60G 2206/20* (2013.01); *B60G 21/053* (2013.01)

(56) References Cited

U.S. PATENT DOCUMENTS

| | | | | |
|---|---|---|---|---|
| 5,052,528 | A | * 10/1991 | Sullivan | ........................ 188/317 |
| 6,283,483 | B1 | * 9/2001 | Johnson et al. | .......... 280/86.758 |
| 8,276,925 | B2 | * 10/2012 | Varela et al. | ............. 280/93.512 |
| 2013/0062850 | A1 | * 3/2013 | Kim et al. | ................ 280/93.511 |

FOREIGN PATENT DOCUMENTS

| | | |
|---|---|---|
| DE | 10 2009 003 832 A1 | 11/2010 |
| EP | 1 538 066 A1 | 6/2005 |
| FR | 2 853 281 A1 | 10/2004 |
| FR | 2 936 182 A3 | 3/2010 |
| FR | 2 950 290 A1 | 3/2011 |
| JP | H3-45409 A | 2/1991 |
| WO | 2004/089665 A1 | 10/2004 |
| WO | 2009/155911 A1 | 12/2009 |
| WO | 2011/036372 A1 | 3/2011 |

OTHER PUBLICATIONS

International Search Report Corresponding to PCT/EP2012/067071 mailed Nov. 2, 2012.

Written Opinion Corresponding to PCT/EP2012/067071 mailed Nov. 2, 2012.

* cited by examiner

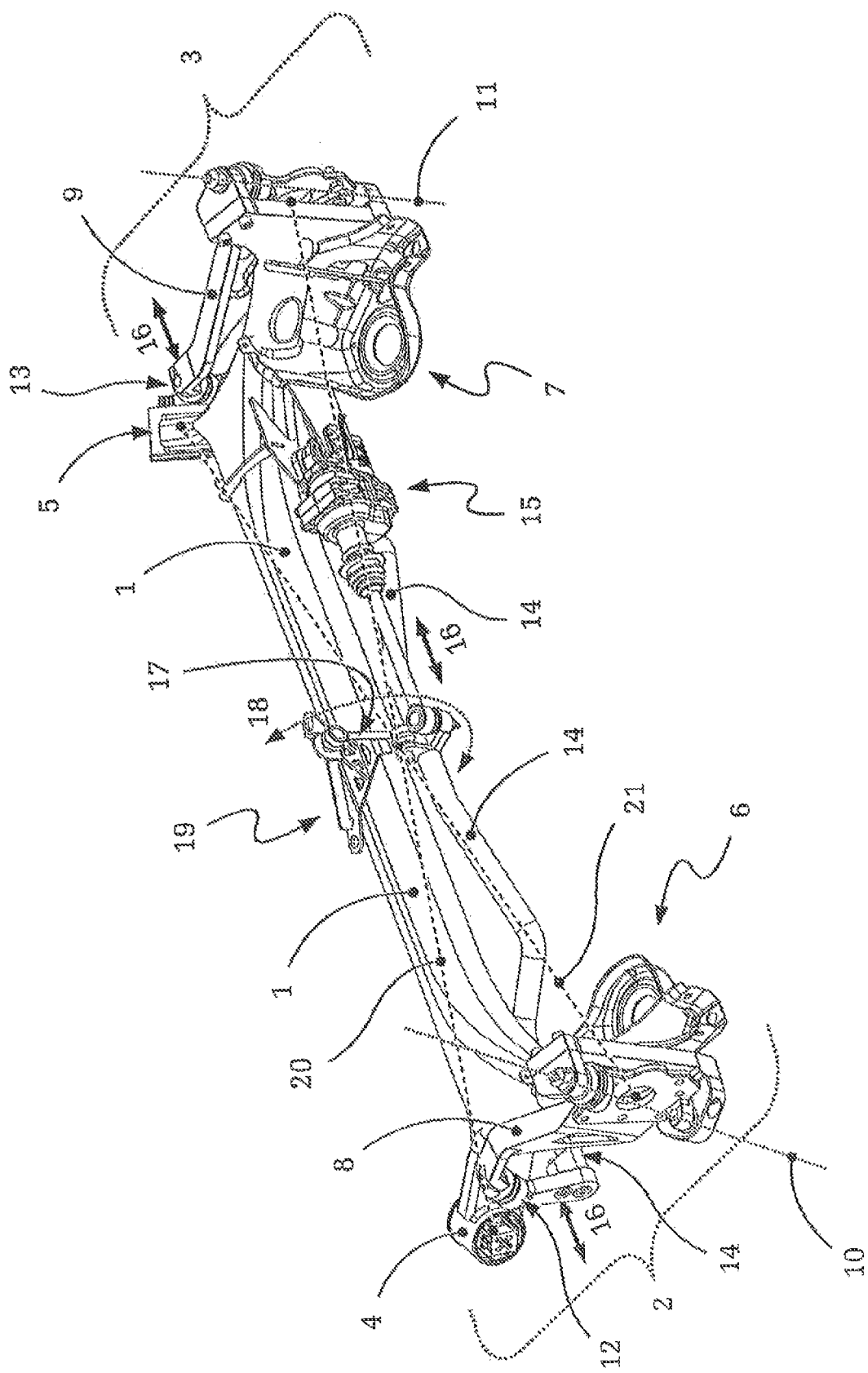

STEERABLE TWIST-BEAM REAR SUSPENSION

This application is a National Stage completion of PCT/EP2012/067071 filed Sep. 3, 2012, which claims priority from German patent application serial no. 10 2011 082 768A filed Sep. 15, 2011.

FIELD OF THE INVENTION

The invention concerns a steerable twist-beam rear suspension for a wheel suspension of a motor vehicle.

BACKGROUND OF THE INVENTION

Torsion beam axles of the type concerned have characteristics common to both trailing arm axles and conventional solid axles. They are usually of simple design and consist essentially of two trailing arms which are resistant to torsion and bending, and which are connected to one another by a cross-member that is also resistant to bending but is compliant to torsion. Due to the torsionally compliant design of the cross-member, the wheel-carrying trailing arms can twist relative to one another. At the same time, the cross-member of the torsion beam axle acts as a roll stabilizer for the vehicle. In general the torsion beam axle enables good straight-ahead driving behavior, which is ensured by the fact that the two trailing arms guide their respective wheels firmly in the longitudinal direction. During compression and rebound bouncing movements on the same side, the trailing arms pivot with the cross-member like a horizontal pendulum about the articulation point on the bottom of the vehicle, so that the wheel track changes only very slightly. When bouncing on alternate sides, the cross-member twists and thereby compensates for height differences between the two wheels.

For the rear axle of a vehicle torsion, beam axles are an inexpensive solution since they largely consist of only one welded assembly with two rubber mountings. Moreover, this type of axle is simple to assemble and can be fitted on the motor vehicle in a space-saving manner, so many passenger automobiles up to the compact class are built with axles of this type.

However, there are known to be limitations with regard to the driving dynamics of a torsion beam axle, particularly due to the design-related, unfavorable action of lateral forces which results in a tendency toward lateral force overcompensation and more difficult isolation of vibrations. A torsion beam axle of the type concerned for a motor vehicle is known from DE 10 2008 002 639 A1. This torsion beam axle comprises a cross-member which couples the bouncing movements of the rear wheels of the motor vehicle with one another in a torsionally compliant manner by means of trailing arms. At its ends on each side of the vehicle, the cross-member is connected to a trailing arm on which, in each case, a vehicle wheel carrier is fixed. In this prior art, to hold the vehicle wheel concerned and to connect the trailing arm and the vehicle wheel, a wheel carrier is provided, which allows steering movement of the wheel concerned by virtue of a pivoting connection to the trailing arm. The associated steering movement is produced by an actuating mechanism that is connected to the wheel carriers by a tie rod.

Thus, the torsion beam axle known from the document enables the track angle of the rear wheels to be actively adjusted in order, in particular, thereby to improve the driving dynamics of the torsion beam axle. However, with the torsion beam axle known from that document—depending on the positioning and articulation of the tie rod—the arrangement of the tie rod and actuating mechanism may be kinematically inappropriate and, depending on the (sometimes) unilateral bouncing of the torsion beam axle, this can result in particular in track angle differences, i.e. erroneous steering angles of the steered rear wheels.

SUMMARY OF THE INVENTION

Against this background the purpose of the present invention is to provide a torsion beam axle in which the tie rod and actuating mechanism are designed in a kinematically optimized manner with a view to minimizing track angle differences.

The invention concerns a torsion beam axle for the wheel suspension of a motor vehicle, wherein the torsion beam axle comprises a torsionally compliant transverse section with respective trailing arms connected to each end thereof. The transverse section is also called a cross-member and, in cross-section, can have the shape of a rounded or angular U or V or a combination. The transverse section can also be formed as a combination of the shapes and can be an integral, one-piece, or a multi-component structure. The transverse section can be made as a pressed component, for example produced from a tube, or as a component produced by internal high-pressure forming. Each trailing arm supports a wheel carrier that can pivot about a steering axis, and the wheel carriers are connected to one another via ball joints by means of a tie rod, and are coupled to an actuating mechanism. This makes it possible to produce a steering movement of the wheel carriers, and thus also of the vehicle wheels that can be fitted onto them, by actuator means.

The torsion beam axle of the type is developed further by the present invention in that a coupling system acts upon the tie rod, the coupling system being designed to restrict the degrees of freedom of rotational movement of the tie rod.

Above and in what follows, when a vehicle is mentioned this can mean both a motor vehicle equipped with a drive unit of its own, and also a non-driven vehicle such as a trailer, in which a torsion beam axle is provided. In the context of the invention the expression "degree of freedom of rotational movement of the tie rod" should be understood to refer to the rotation of the tie rod about the axis defined by the two ball joints by means of which the tie rod is usually connected to the wheel carriers. If the tie rod is not angled but straight, as in the case of a tube, then the rotation of the tie rod referred to is rotation about its longitudinal axis.

In the torsion beam axle according to the invention—referring to the kinematic coupling system—the degrees of freedom of rotational movement of the tie rod is restricted or such rotation is prevented. Without the coupling system—by virtue of its connection to the wheel carriers, such connections usually being in the form of ball joints—the tie rod of a torsion beam axle of the type concerned has a rotational degree of freedom and can rotate about the axis defined by the ball joints, or pivot about that axis. This means that both the tie rod and also the actuating mechanism which acts upon the tie rod in a torsion beam axle of this type may be located kinematically inappropriately. As explained earlier, this can result in undesired operating conditions, in particular track errors or track angle differences, for example but not exclusively during unilateral bouncing of the torsion beam axle.

By virtue of the kinematic coupling provided in accordance with the invention, the coupling system restricts the degrees of freedom of rotational movement of the tie rod due to the co-operation of the coupling system with the other attachment points of the tie rod in the form of ball joints on the wheel carriers. Thus, the tie rod can no longer rotate or pivot freely about its longitudinal axis or the axis defined by the two ball joints on the wheel carriers, so that the kinematically determined position of the tie rod is advantageously maintained.

Consequently, the tie rod can only still undergo the intended, translational movements approximately transversely to the driving direction or approximately parallel to the transverse section of the torsion beam axle. Thus, the tie rod transmits the actuation movement of the actuating mechanism to the wheel carriers, whereby in turn the desired steering angle of the wheel carriers and vehicle wheels is obtained.

By virtue of the accordingly restricted degree of freedom of the tie rod and thus also of the actuating mechanism coupled thereto, a more secure operating condition is obtained in relation to the control or steering of the rear wheels enabled by the actuating mechanism, tie rod and wheel carriers. In this way track errors or track angle differences are avoided or minimized, in particular during unilateral bouncing of the torsion beam axle.

The invention can be implemented regardless of where and how the coupling system is attached, provided that its effect is to restrict the degree of freedom of rotational movement of the tie rod. In a preferred design of the invention the coupling system is fixed onto the transverse section of the torsion beam axle. This enables the coupling system to be accommodated on the torsion beam axle in a space-saving manner and the tie rod can follow the bouncing movements of the torsion beam axle, whereby track angle differences during bouncing movements in opposite directions are minimized or prevented.

Preferably, the degree of freedom of rotational movement of the tie rod is also restricted in that the coupling system is arranged approximately parallel to the vertical axis of the vehicle or along a direction tangential to the rotational axis of the tie rod approximately parallel, in particular exactly parallel to the vertical axis of the vehicle. Alternatively, however, the coupling system can also be connected along a direction tangential to the rotational axis of the tie rod. Thus, for example, it can be connected approximately or exactly parallel to the longitudinal axis of the vehicle.

In the context of the invention the expression "along a direction tangential to the rotational axis of the tie rod" should be understood to mean that direction which—for an imaginary rotation movement of the tie rod about the longitudinal axis defined by the ball joints of the wheel carriers—is defined by the connection point of the coupling system to the tie rod. In other words, if the tie rod is articulated at the point where the coupling system is connected to it along the vertical direction or vertical axis of the vehicle or along the direction, then the restriction of the degree of freedom of movement rotational of the tie rod is achieved.

In a preferred design of the invention, the coupling system comprises a pendulum support. In relation to the degree of freedom of rotation of the tie rod, the pendulum support couples the transverse section of the torsion beam axle kinematically to the tie rod. The design of the coupling system in the form of a pendulum support can be produced inexpensively, takes up little space and can also be made to have a vibration-damping effect, for example by using elastomeric mountings for the pendulum support. Preferably, in this case the longitudinal axis of the pendulum support extends approximately or exactly parallel to the vertical axis of the vehicle or parallel to a direction tangential to the rotational axis of the tie rod. In this way the tie rod can be supported effectively in relation to rotation, since the direction of the residual degree of freedom of the tie rod then coincides with the longitudinal axis of the pendulum support. At the same time, the degree of freedom of translational movement of the tie rod required for transmitting the steering movements is retained.

In a further preferred design of the invention, the pendulum support is connected to the tie rod approximately at the mid-point of the tie rod, in particular exactly at the mid-point thereof. Preferably, in this case the attachment of the pendulum support to the tie rod is positioned at the shear center of the transverse section of the torsion beam axle.

The shear center of the transverse section is the imaginary point on the transverse section at which the torque axis of a unilateral bouncing movement approximately meets or intersects the transverse section. This is because during unilateral bouncing movement of the torsion beam axle, the kinematics of the torsion beam axle—owing to the twisting of the transverse section—resemble those of a semi-trailing arm axle, resulting in a torque axis of the bouncing movement which extends on the one hand through the respective mounting of the bouncing trailing arm and on the other hand through the imaginary shear center of the transverse section.

In other words, a feature of this invention is that during bouncing movement, the shear center of the transverse section—as also the attachment point of the pendulum support located there in this embodiment—undergo no movement, or at any rate only a very small movement in the bouncing direction. This (as also in general the central positioning of the attachment point of the pendulum support to the transverse section or the tie rod) is also an advantage for minimizing the track angle difference and for minimizing deviations of the wheel carrier steering angle from its desired value.

The invention can be implemented regardless of how the actuator is connected to the tie rod of the torsion beam axle. Again with a view to minimizing track angle differences or eliminating unsymmetrical behavior during unilateral bouncing, a further embodiment of the invention provides that the connection between the actuator and the tie rod is formed by a joint arranged at the middle of the tie rod in the direction transverse to the vehicle.

To compensate for relative movement between corresponding components of the torsion beam axle, in particular for the damping of vibrations, it is also advantageous for the articulated connection between the actuator and the tie rod to have two degrees of freedom, such that consequently it preferably consists of a ball joint, a sleeve joint or an elastomeric mounting which allows rotational movement and to a limited extent also cardanic deflections. Particularly when an elastomeric mounting is used, not only is comfort improved but also the individual components are less prone to wear, so that the useful life of the steerable torsion beam axle as a whole is extended.

A further advantageous concept of the invention is that the actuator is an electric-motor, hydraulic or pneumatic control element, depending on which type of auxiliary energy is available in the motor vehicle or can be used in a simple manner to drive the actuator, so that additional structural or design complexity can largely be avoided. With regard to these boundary conditions, in this embodiment the actuator can be optimally integrated into the system.

Preferably, the actuator is attached to one of the trailing arms This has the advantage that on each of the trailing arms there is a high stability zone of the torsion beam axle. In particular, in these zones there is almost no risk that the operation of the actuator will be influenced by any twisting or deformations of the torsion beam axle, so that in this way the torsion beam axle can function without problems. As before, the attachment point of the actuator can be varied within limits so that adaptation to the fitting space available in the vehicle is possible.

BRIEF DESCRIPTION OF THE DRAWINGS

Below, the invention is explained in more detail with reference to a drawing that illustrates an embodiment, only as an example. The sole FIGURE shows a isometric representation of a steerable torsion beam axle according to an embodiment of the present invention.

DETAILED DESCRIPTION OF THE PREFERRED EMBODIMENTS

The FIGURE shows a steerable torsion beam axle, for example for the rear wheel suspension in a motor vehicle, according to an embodiment of the present invention. In the FIGURE can be seen the axle body, which comprises the torsionally compliant cross-member 1 and two trailing arms 2, 3 connected to the cross-member 1. On the trailing arms 2, 3 are arranged respective elastomeric mountings 4, 5 for connection to a vehicle chassis (not shown). The trailing arms 2, 3 comprise respective spring cups 6, 7 for holding the chassis springs (also not shown).

Furthermore, each trailing arm 2, 3 supports a wheel carrier 8, 9 which can in each case pivot about a respective, vehicle-related steering axis 10, 11 that extends vertically (or approximately so, apart from the steering axle inclination and the camber). The wheel carriers 8, 9 are connected by ball joints 12, 13 to a tie rod 14, which can be moved one way and the other along the direction indicated by the arrows 16 by means of an actuator 15. In this case the actuator 15 is fixed on the trailing arm 3 shown on the right in the drawing, in order in this way to avoid disadvantageous effects upon the operation of the actuator 15 that might occur due to twisting of the transverse section 1 during the operation of the torsion beam axle.

In order to prevent any undesired rotation 18 of the tie rod 14 about the imaginary axis defined by the two ball joints 12, 13, which could otherwise lead to undefined operating conditions and/or to track errors of the steering angle of the wheel carriers 8, 9, the torsion beam axle comprises a coupling system in this case in the form of a pendulum support 17. The pendulum support 17 prevents vertical movement of the tie rod 14 along the arrow direction 18 (which corresponds to a direction tangential to the imaginary rotation of the tie rod about the rotation axis defined by the ball joints 12 and 13). For this purpose, at its lower end in the drawing the pendulum support 17 is attached to the tie rod 14 and at its upper end it is connected by way of a support fitting 19 to the transverse section 1 of the torsion beam axle.

Thus, in relation to its rotation 18 about the rotation axis defined by the ball joints 12 and 13 the tie rod 14 is kinematically fixed by the pendulum support 17 so that, as intended, the tie rod can only undergo the translation movements 16 for the purpose of controlling the steering angle of the wheel carriers 8, 9. Since the steering angle of steered rear wheels is usually small, slight movements of the tie rod 14 induced by lateral deflections of the pendulum support 17 along the vertical or tangential direction 18 can be ignored. Moreover, their influence on the steering angle can be allowed for in the geometrical design of the wheel carriers 8, 9 and thus largely eliminated.

Like the pendulum support 17, the actuator 15 is also attached at the middle of the tie rod 14 so that, in this respect as well, symmetrical steering behavior of the torsion beam axle is ensured during both bilateral and unilateral bouncing.

The broken lines 20, 21 indicate the imaginary instantaneous axes of the bouncing movements of the torsion beam axle, as they occur during respective unilateral bouncing of the trailing arms 2, 3 with the wheel carriers 8, 9 attached to them. For example, the trailing arm 2 on the left in the drawing, with the wheel carrier 8 fixed to it, pivots during unilateral bouncing approximately about the instantaneous axis 20, whereas for its part the trailing arm 3 on the right in the drawing, with the wheel carrier 9 fixed on it, pivots during unilateral bouncing approximately about the instantaneous axis 21. With the torsion beam axle shown (in which the transverse section is attached approximately at the middle of the trailing arms 2, 3), unilateral bouncing movements therefore resemble the bouncing movement of a semi-trailing arm axle, which is advantageous in relation to self-steering behavior and the track angle during unilateral bouncing.

It can be seen that in the embodiment shown, the two instantaneous axes 20, 21 intersect at the point where the pendulum support 17 is attached to the tie rod 14. During unilateral bouncing, this further minimizes the influence of twisting the transverse section 1 of the torsion beam axle upon the steering angle track angle difference, which also contributes toward the secure and reliable track control of the torsion beam axle.

Indexes

1 Transverse section
2, 3 Trailing arm
4, 5 Elastomeric mounting
6, 7 Spring cup
8, 9 Wheel carrier
10, 11 Steering axis
12, 13 Tie rod ball joint
14 Tie rod
15 Actuator
16 Steering movement
17 Coupling system, pendulum support
18 Tie rod rotation movement, rotational degree of freedom
19 Support fitting
20, 21 Instantaneous axis during unilateral bouncing

The invention claimed is:

1. A torsion beam axle for a wheel suspension of a motor vehicle, the torsion beam axle comprising:
   a torsionally compliant transverse section (1), and a trailing arm (2, 3) being connected to the transverse section (1) at each opposed end thereof,
   each of the trailing arms (2, 3) supporting a respective wheel carrier (8, 9) that is pivotable about a steering axis (10, 11),
   the wheel carriers (8, 9) being connected to one another via ball joints (12, 13) and a tie rod (14), and the tie rod (14) being directly coupled to an actuating mechanism (15) for producing a steering movement of the wheel carriers (8, 9) about the respective steering axes (10, 11), the tie rod (14) is coupled to the actuating mechanism (15) by a joint arranged at a center of the tie rod (14) in a transverse direction of the vehicle, and
   a coupling system (17) being directly connected to the tie rod (14) and designed to restrict rotational movement (18) of the tie rod (14) about an axis defined by the two ball joints (12, 13).

2. The torsion beam axle according to claim 1, wherein the coupling system (17) is attached to the transverse section (1) of the torsion beam axle.

3. The torsion beam axle according to claim 1, wherein the coupling system (17) is either arranged approximately parallel to a vertical axis of the vehicle or along a direction tangential to a rotational axis of the tie rod (14).

4. The torsion beam axle according to claim 3, wherein the coupling system comprises a pendulum support (17) which directly kinematically couples the transverse section (1) to the tie rod (14) in relation to the degree of freedom (18) of rotation of the tie rod (14).

5. The torsion beam axle according to claim 4, wherein the longitudinal axis of the pendulum support (17) either extends approximately parallel to the vertical axis of the vehicle or parallel to the direction tangential to the rotational axis of the tie rod (14).

6. The torsion beam axle according to claim 4, wherein the pendulum support (17) is articulated to the tie rod (14) approximately at a middle of the tie rod (14).

7. The torsion beam axle according to claim 4, wherein a joint of the pendulum support (17), on a tie rod side, is positioned at a shear center of the transverse section (1) of the torsion beam axle.

8. The torsion beam axle according to claim 1, wherein the joint arranged at the center has two degrees of freedom and is either a ball joint or a sleeve joint.

9. The torsion beam axle according to claim 1, wherein the actuating mechanism (15) is one of an electric-motor, a hydraulic control element and a pneumatic control element.

10. The torsion beam axle according to claim 1, wherein the actuating mechanism is fixed to a trailing arm (3) of the torsion beam axle.

11. A torsion beam axle for a wheel suspension of a motor vehicle, the torsion beam axle comprising:
    a torsionally compliant section that extends in a transverse direction with respect to a longitudinal axis of the vehicle, and the torsionally compliant section having opposed ends;
    a trailing arm being connected to each opposed end of the torsionally compliant section and each of the trailing arms supporting a respective wheel carrier such that the wheel carriers being pivotable about a respective steering axis;
    the wheel carriers being connected to one another via ball joints and the torsionally compliant section of the torsion beam axle, and the wheel carriers being coupled, via tie rods, to an actuating mechanism which is actuatable to pivot the wheel carriers about the respective steering axes;
    a coupling system being directly connected to the tie rods, and the coupling system preventing vertical movement of the tie rods as well as restricting rotational movement of the tie rods about an axis defined by the two ball joints; and the actuating mechanism couples one of the tie rods with one of the trail arms.

12. A torsion beam axle for a wheel suspension of a motor vehicle, the torsion beam axle comprising:
    a torsionally compliant transverse section supporting a first trailing arm at a first end thereof and supporting a second trailing arm at a second end thereof;
    the first trailing arm supporting a first wheel carrier that is pivotable about a first steering axis and the second trailing arm supporting a second wheel carrier that is pivotable about a second steering axis;
    the first wheel carrier being connected to a pendulum support by a first ball joint and a first tie rod while the second wheel carrier being connected to the pendulum support by a second ball joint, a second tie rod and an actuating mechanism;
    the actuating mechanism facilitating pivoting movement of the first and second tie rods for producing a steering movement of the first and the second wheel carriers about the respective first and the second steering axes;
    the pendulum support preventing vertical movement of the first and the second tie rods as well as restricting rotational movement of the first and the second tie rods about an axis defined by the first and the second ball joints so that the first and the second tie rods can only undergo translation movement while controlling a steering angle of the first and the second wheel carriers; and
    a vertically lower end of the pendulum support being attached to the first and the second tie rods while a vertical upper end of the pendulum support being connected by a support fitting to a transverse section of the torsion beam axle.

* * * * *